US 7,940,414 B2

(12) United States Patent
Ozawa (10) Patent No.: US 7,940,414 B2
(45) Date of Patent: May 10, 2011

(54) IMAGE PROCESSING DEVICE, IMAGE FORMING DEVICE, IMAGE PROCESSING METHOD, IMAGE FORMING METHOD, PROGRAM, AND COMPUTER READABLE RECORDING MEDIUM ON WHICH THE PROGRAM IS RECORDED

(75) Inventor: Masahiro Ozawa, Machida (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 234 days.

(21) Appl. No.: 12/134,953

(22) Filed: Jun. 6, 2008

(65) Prior Publication Data
US 2008/0309972 A1 Dec. 18, 2008

Related U.S. Application Data

(62) Division of application No. 10/368,481, filed on Feb. 20, 2003.

(30) Foreign Application Priority Data

Nov. 19, 2002 (JP) .................................. 2002-335277

(51) Int. Cl.
*G06F 15/00* (2006.01)
(52) U.S. Cl. ...................... 358/1.15; 358/1.13; 358/1.16; 358/1.17; 358/1.18; 709/205
(58) Field of Classification Search .................. 358/1.15, 358/1.13, 1.16, 1.17, 1.18; 709/205
See application file for complete search history.

(56) References Cited

U.S. PATENT DOCUMENTS

| | | | |
|---|---|---|---|
| 6,067,553 A | 5/2000 | Downs et al. | |
| 6,407,821 B1 | 6/2002 | Hohensee et al. | |
| 7,072,055 B1 | 7/2006 | Carter et al. | |
| 7,362,457 B1 * | 4/2008 | Shima | 358/1.15 |
| 2002/0126306 A1 | 9/2002 | Chohsa et al. | |
| 2002/0140958 A1 | 10/2002 | Lester | |
| 2003/0038964 A1 | 2/2003 | Ferlitsch | |
| 2003/0237054 A1 * | 12/2003 | Donahue | 715/525 |

FOREIGN PATENT DOCUMENTS

| | | |
|---|---|---|
| JP | 09-146719 A | 6/1997 |
| JP | 11-024861 A | 1/1999 |
| JP | 2000-172464 | 6/2000 |
| JP | 2001-334705 A | 12/2001 |
| JP | 2002-116898 | 4/2002 |

* cited by examiner

Primary Examiner — Twyler L Haskins
Assistant Examiner — Mark R Milia
(74) Attorney, Agent, or Firm — Buchanan Ingersoll & Rooney PC (57) ABSTRACT

In case of transmitting a document file such as a PDF file to a printer without converting it into print data, a PC extracts from the document file to be printed information to be accessed when starting an analysis of the document file and transmits the information to the printer. The PC extracts a specified data from the document file and transmits it to the printer each time when the specified data is requested by the printer.

15 Claims, 10 Drawing Sheets

| Header | %PDF.1.4 | | 510 |
| --- | --- | --- | --- |
| Body | 1 0 obj<br>≪ /Type /Catalog<br>/Outlines 2 0 R<br>/Pages 3 0 R<br>≫<br>endobj | 1 | 520 |
| | 2 0 obj<br>≪ /Type Outlines<br>/Count 0<br>≫<br>endobj | 2 | |
| | 3 0 obj<br>≪ /Type /Pages<br>/Kids [4 0 R]<br>/Count 1<br>≫<br>endobj | 3 | |
| | 4 0 obj<br>≪ /Type /Page<br>/Parent 3 0 R<br>/MediaBox [0 0 612 792]<br>/Contents 5 0 R<br>/Resources ≪ /ProcSet 6 0 R ≫<br>≫<br>endobj | 4 | |
| | 5 0 obj<br>≪ /Length 35 ≫<br>stream<br>···Page-marking operators···<br>endstream<br>endobj | 5 | |
| | 6 0 obj<br>[/PDF]<br>endobj | 6 | |
| Cross-reference table | xref<br>0 7<br>0000000000 65535 f<br>0000000009 00000 n<br>0000000074 00000 n<br>0000000120 00000 n<br>0000000179 00000 n<br>0000000300 00000 n<br>0000000384 00000 n | | 530 |
| Trailer | trailer<br>≪ /Size 7<br>/Root 1 0 R<br>≫<br>startxref<br>408<br>%%EOF | | 540 |

| PRINTING CONDITION | VALUE |
|---|---|
| BOOKLET STITCHING | ON |
| FACE UP | OFF |
| N-in-1 | 1 |
| ⋮ | ⋮ |
| NUMBER OF COPIES | 1 |
| COLLATION | OFF |

FIG. 14

IMAGE PROCESSING DEVICE, IMAGE FORMING DEVICE, IMAGE PROCESSING METHOD, IMAGE FORMING METHOD, PROGRAM, AND COMPUTER READABLE RECORDING MEDIUM ON WHICH THE PROGRAM IS RECORDED

CROSS-REFERENCE TO RELATED PATENT APPLICATION

This application is a divisional of U.S. patent application Ser. No. 10/368,481, filed on Feb. 20, 2003.

BACKGROUND OF THE INVENTION

1. Field of the Invention

The invention relates to an image processing device, an image forming device, an image processing method, an image forming method, a program, and a computer readable recording medium on which the program is recorded. In particular, the invention relates to an image processing device, an image forming device, an image processing method, an image forming method, a program, and a computer readable recording medium on which the program is recorded, for transmitting and printing a document file, which includes objects that can be arranged in the file in an order different from the order of pages as well as reference information that indicates the locations of the objects within the file, and which defines pages having a specified object, from the image processing device to the image forming device without converting the document file into print data.

2. Description of the Related Art

A personal computer ("PC") is capable of transmitting a document file stored in, for example, a hard disk to a printer via a network such as LAN.

In this case, the document file is transmitted after being converted into print data described in a printer-recognizable PDL (Page Description Language) such as PS (PostScript®) by means of a printer driver typically installed in the PC.

On the other hand, PDF (Portable Document Format) files are widely used being distributed over the Internet as a type of document file that can be reproduced in the same format as the original document regardless of the types of hardware or application. The PDF file has objects that can be arranged in a file in an order different from the order of pages and reference information that indicates the locations of the objects in the file, and defines a page consisting of specified objects.

In the meanwhile, a PDF file may contain several hundreds of pages of data. When such a large PDF file is converted into print data by a PC, the load on the PC can be enormous due to the reason that it takes a long time to convert, requires a complicated process, it takes a long time to transmit the data as the data size increases as a result of the conversion, etc. In order to reduce the PC's load, printers that are capable of directly printing a PDF file transmitted directly from a PC without the conversion ("PDF direct printing") have been proposed.

However, although a printer can print from the top page of the print data received in case of print data that are described in PDL such as PS as the data to be printed are arranged in the order of pages in a file, a printer cannot print until after the entire data is received in case of a PDF file as the data to be printed can be arranged irrespective of the order of pages in the file. Consequently, such a printer sometimes ends up being unable to print a PDF file as it cannot receive the entire file due to the limitation of its memory capacity (usable capacity or vacant capacity).

In connection with this problem, devices that are capable of reconstituting the contents of a PDF file in order to display the data in the order of receipt without having to receive the entire PDF file have been proposed (e.g., U.S. Pat. No. 6,067,553).

However, in case of the device disclosed in the abovementioned issued patent, it still requires a complicated process for reconstituting a PDF file on the transmission side, such as a PC, prior to the file transfer. Therefore, the technology in the above device has a problem that it does not reduce the load on the PC compared to converting PDF files into print data described in PDL such as PS.

Moreover, the abovementioned technology is basically a technology of displaying on display units so that it does not take much consideration in printing on printers. More specifically, in case there is a need of printing a file in the order different from the order of pages in the file, such as in a case when a special printing condition, for example, face up, is applied, where printing is executed from the last page to the top page sequentially, the abovementioned technology cannot be used, thus making it difficult to be applied to the PDF direct printing.

Further, because PDF files are widely distributed, it is preferable to be able to exchange them over the network without adding any changes or correction. Another problem with the abovementioned device is that a revised file becomes completely different from the original PDF file. Moreover, some of the PDF files are constituted in such a way that does not allow any changes from the security standpoint, thus making them impossible to be reconstituted at all.

SUMMARY OF THE INVENTION

It is an object of the present invention to provide an image processing device, an image forming device, an image processing method, an image forming method, a program, and a computer readable recording medium on which the program is recorded, which are improved for solving the abovementioned problems.

A more specific object of the present invention is to provide an image processing device, an image forming device, an image processing method, an image forming method, a program, and a computer readable recording medium on which the program is recorded that make it possible to print more securely considering the printing condition even when document files such as PDF files are transmitted without being converted to print data to an image forming device having a memory unit with a limited amount of usable capacity while simultaneously suppressing the load on the transmission side.

According to an aspect of the invention, there is provided an image processing device for transmitting a document file, which includes objects that can be arranged in the file in an order different from the order of pages as well as reference information that indicates the locations of the objects within the file, and which defines pages having a specified object, to an image forming device without converting the document file into print data, comprising: a first extractor for extracting from the document file to be printed information to be accessed when starting an analysis of the document file; a first transmitter for transmitting the information extracted from the document file by the first extractor to the image forming device for printing the document file; a receiver for receiving a transmission request concerning a specific data among the document file from the image forming device; a second extractor for extracting a data in correspondence with the transmission request from the document file; and a second transmitter for transmitting the data extracted from the document file by the second extractor to the image forming device.

The invention makes it possible to print a document file such as a PDF file safely even when the document file is transmitted to an image forming device having a storage unit with a limited amount of usable capacity without converting it into print data. It is also capable of reducing the load of the transmission side as it is not necessary to do any changes such as reconstitution and conversion of a document file on the document transmission side. It can also easily handle any special printing conditions such as booklet stitching or face up, which require printing a file in an order different from the order of pages in the file, by determining the data, which is requested by the image forming device to be transmitted from the image processing device, with reference to the printing condition.

According to another aspect of the invention, there is provided an image forming device for receiving and printing a document file, which includes objects that can be arranged in the file in an order different from the order of pages as well as reference information that indicates the locations of the objects within the file, and which defines pages having a specified object, from an image processing device without converting the document file into print data, comprising: a first receiver for receiving from the image processing device information, which is extracted from the document file to be printed and is to be accessed when starting an analysis of the document file; a controller for determining a necessary data from the document file based on the result of the analysis of the information received by the first receiver; a transmitter for transmitting a transmission request concerning the necessary data to the image processing device; a second receiver for receiving the data transmitted by the image processing device in correspondence with the transmission request; and a printing unit for printing based on the data received by the second receiver.

According to still another aspect of the invention, there is provided a program to be used in an image processing device for transmitting a document file, which includes objects that can be arranged in the file in an order different from the order of pages as well as reference information that indicates the locations of the objects within the file, and which defines pages having a specified object, to an image forming device without converting the document file into print data, the program causing the image processing device to execute a process comprising the steps of: 1) extracting from the document file to be printed information to be accessed when starting an analysis of the document file; 2) transmitting the information extracted from the document file in step 1) to the image forming device for printing the document file; 3) receiving a transmission request concerning a specific data among the document file from the image forming device; 4) extracting a data in correspondence with the transmission request from the document file; and 5) transmitting the data extracted from the document file in step 4) to the image forming device.

According to a further aspect of the invention, there is provided a program to be used in an image forming device for receiving and printing a document file, which includes objects that can be arranged in the file in an order different from the order of pages as well as reference information that indicates the locations of the objects within the file, and which defines pages having a specified object, from an image processing device without converting the document file into print data, the program causing the image forming device to execute a process comprising the steps of: 1) receiving from the image processing device information, which is extracted from the document file to be printed and is to be accessed when starting an analysis of the document file; 2) determining a necessary data from the document file based on the result of the analysis of the information received in step 1); 3) transmitting a transmission request concerning the necessary data to the image processing device; 4) receiving the data transmitted by the image processing device in correspondence with the transmission request; and 5) printing based on the data received in step 4).

According to a still further aspect of the invention, there is provided an image processing method for transmitting a document file, which includes objects that can be arranged in the file in an order different from the order of pages as well as reference information that indicates the locations of the objects within the file, and which defines pages having a specified object, to an image forming device without converting the document file into print data, comprising the steps of: 1) extracting from the document file to be printed information to be accessed when starting an analysis of the document file; 2) transmitting the information extracted from the document file in step 1) to the image forming device for printing the document file; 3) receiving a transmission request concerning a specific data among the document file from the image forming device; 4) extracting a data in correspondence with the transmission request from the document file; and 5) transmitting the data extracted from the document file in step 4) to the image forming device.

According to a yet further aspect of the invention, there is provided an image forming method for receiving and printing a document file, which includes objects that can be arranged in the file in an order different from the order of pages as well as reference information that indicates the locations of the objects within the file, and which defines pages having a specified object, from an image processing device without converting the document file into print data, comprising the steps of: 1) receiving from the image processing device information, which is extracted from the document file to be printed and is to be accessed when starting an analysis of the document file; 2) determining a necessary data from the document file based on the result of the analysis of the information received in step 1); 3) transmitting a transmission request concerning the necessary data to the image processing device; 4) receiving the data transmitted by the image processing device in correspondence with the transmission request; and 5) printing based on the data received in step 4).

The objects, characteristics and properties of this invention other than those set forth above will become apparent from the description given herein below with reference to preferred embodiments illustrated in the accompanying drawings.

DETAILED DESCRIPTION OF THE PREFERRED EMBODIMENTS

The embodiments of this invention will be described below with reference to the accompanying drawings.

Figure 1:
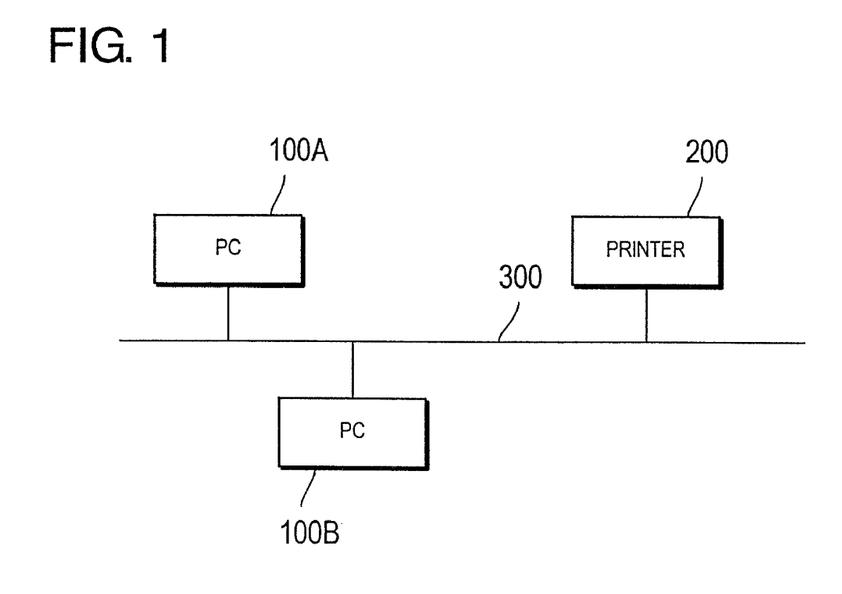
FIG. 1 is a block diagram showing the constitution of a printing system including PCs and a printer according to an embodiment of the present invention.

FIG. 1 is a block diagram showing the constitution of a printing system including a PC and a printer according to an embodiment of the present invention. As shown in FIG. 1, the printing system is equipped with PCs 100A and 100B having a function as an image processing device and a printer 200 as an image forming device which are connected communicably with each other via a network 300. The network 300 consists of a LAN based on standards such as Ethernet®, Token Ring, FDDI, etc., and a WAN consisting of LANs connected by a dedicated line.

The types and the number of equipment to be connected to the network are not limited to those shown in FIG. 1. The printer 200 can be connected directly with PC 100A or 100B (local connection) without going through the network 300.

Figure 2:
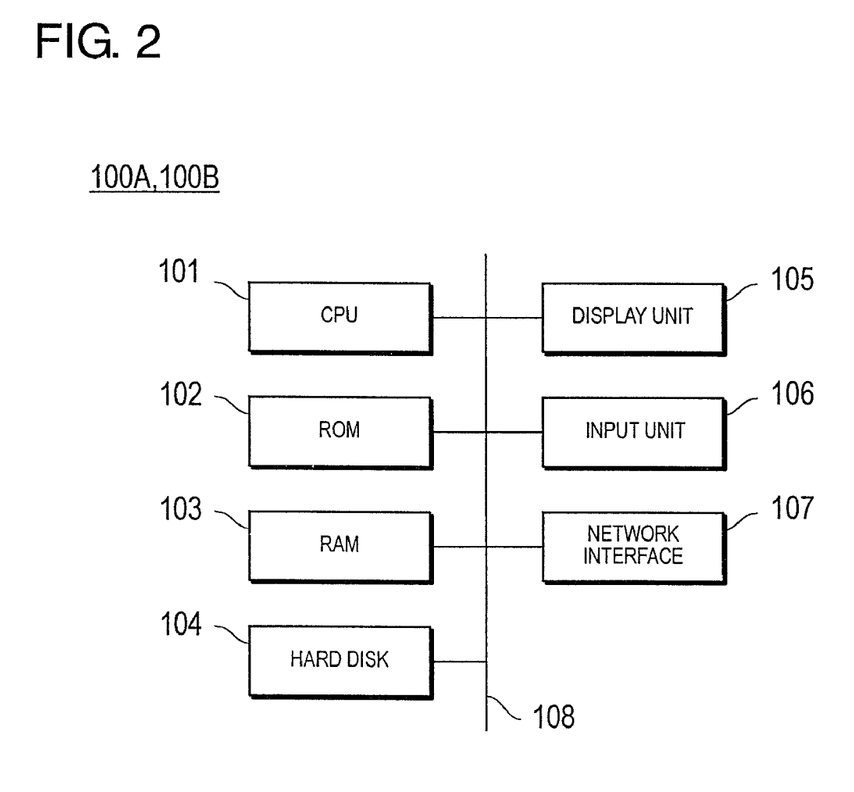
FIG. 2 is a block diagram showing the constitution of the PCs shown in FIG. 1.

FIG. 2 is a block diagram showing the constitution of the PC 100A or 100B shown in FIG. 1. As shown in FIG. 2, the PC 100A or 100B contains a CPU 101 for controlling the entire device and executing various computations, a ROM 102 for storing programs and data, a RAM 103 for storing programs and data temporarily, a hard disk 104 as an external storage unit for storing various programs and data, a display unit 105 such as a liquid crystal display for displaying various information, an input unit 106 consisting of a keyboard, a mouse, etc., for entering various instructions, and a network interface 107 such as a LAN card for connecting to the network 300, all of which are interconnected via a bus 108 for exchanging signals.

Figure 3:
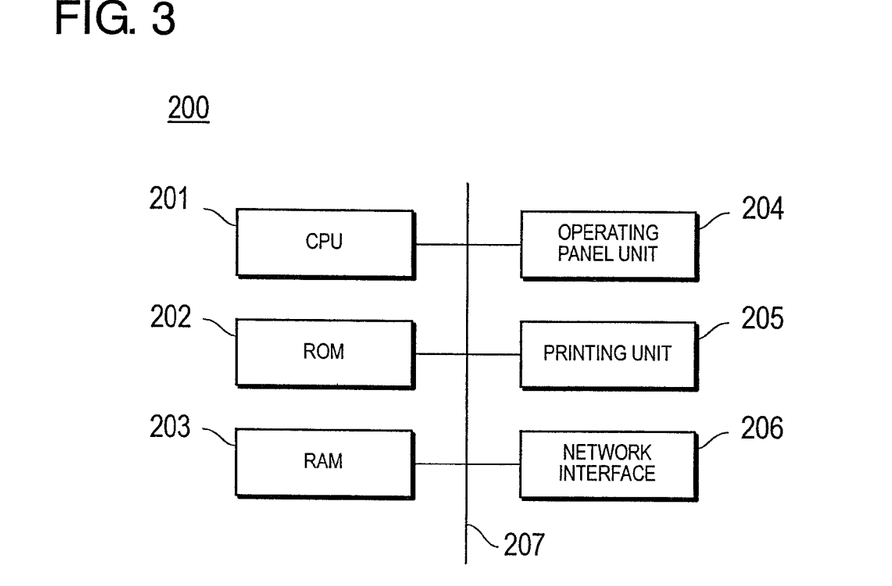
FIG. 3 is a block diagram showing the constitution of the printer shown in FIG. 1.

FIG. 3 is a block diagram showing the constitution of the printer 200 shown in FIG. 1. As shown in FIG. 3, the printer 200 contains a CPU 201, a ROM 202, a RMA 203, an operating panel unit 204, a printing unit 205, and a network interface 206, all of which are interconnected by a bus 207 for exchanging signals. Of the constituting elements of the printer 200, those that have the identical functions as the constituting members of the PCs 100A and 100B are not described here to avoid duplications.

The RAM 203 can store the data received from the PC temporarily. The ROM 202 stores font data, which are the data concerning the fonts of characters. The printer 200 can be equipped with a hard disk as an external storage unit for storing various programs and data. The operating panel unit 204 is used for various information displays and entering various instructions. The printing unit 205 prints various data on a recording medium such as paper using a known image forming process such as an electronic photography type process.

The PCs 100A and 100B as well as the printer 200 can contain constitutional elements other than those described above, or may not include a portion of the abovementioned elements. A case of transmitting data from the PC 100A to the printer 200 for printing will be described below.

In the printing system shown in FIG. 1, two types of printing, namely, the normal printing and the PDF direct printing, are possible. In executing the normal printing, a specific file is transmitted to the printer 200 after being converted into print data described in PDL such as PS by means of a printer driver installed in the hard disk 104 of PC 100A. On the other hand, in executing the PDF direct printing, a PDF file is transmitted from the PC 100A to the printer 200 without being transformed into print data according to a program (to be described later) installed in the hard disk 104.

Figure 4:
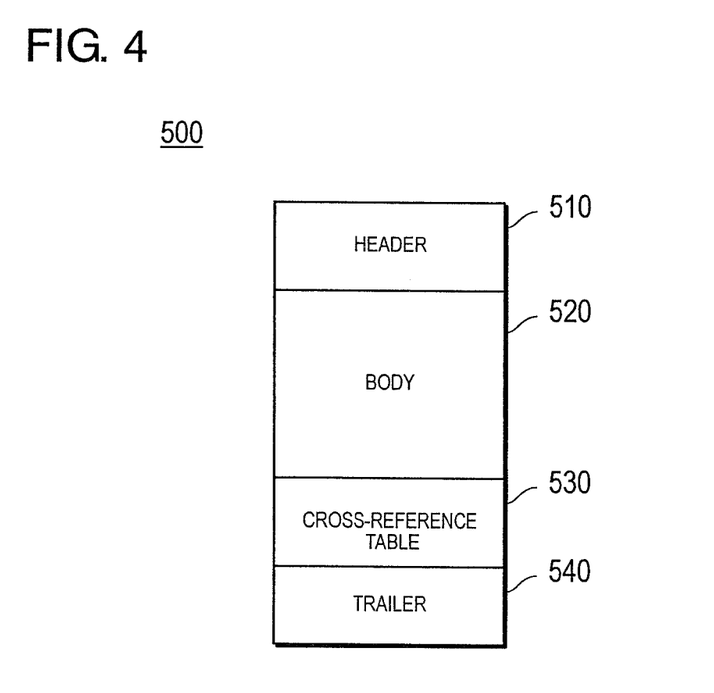
FIG. 4 is a diagram for describing a standard PDF file.
Figure 5:
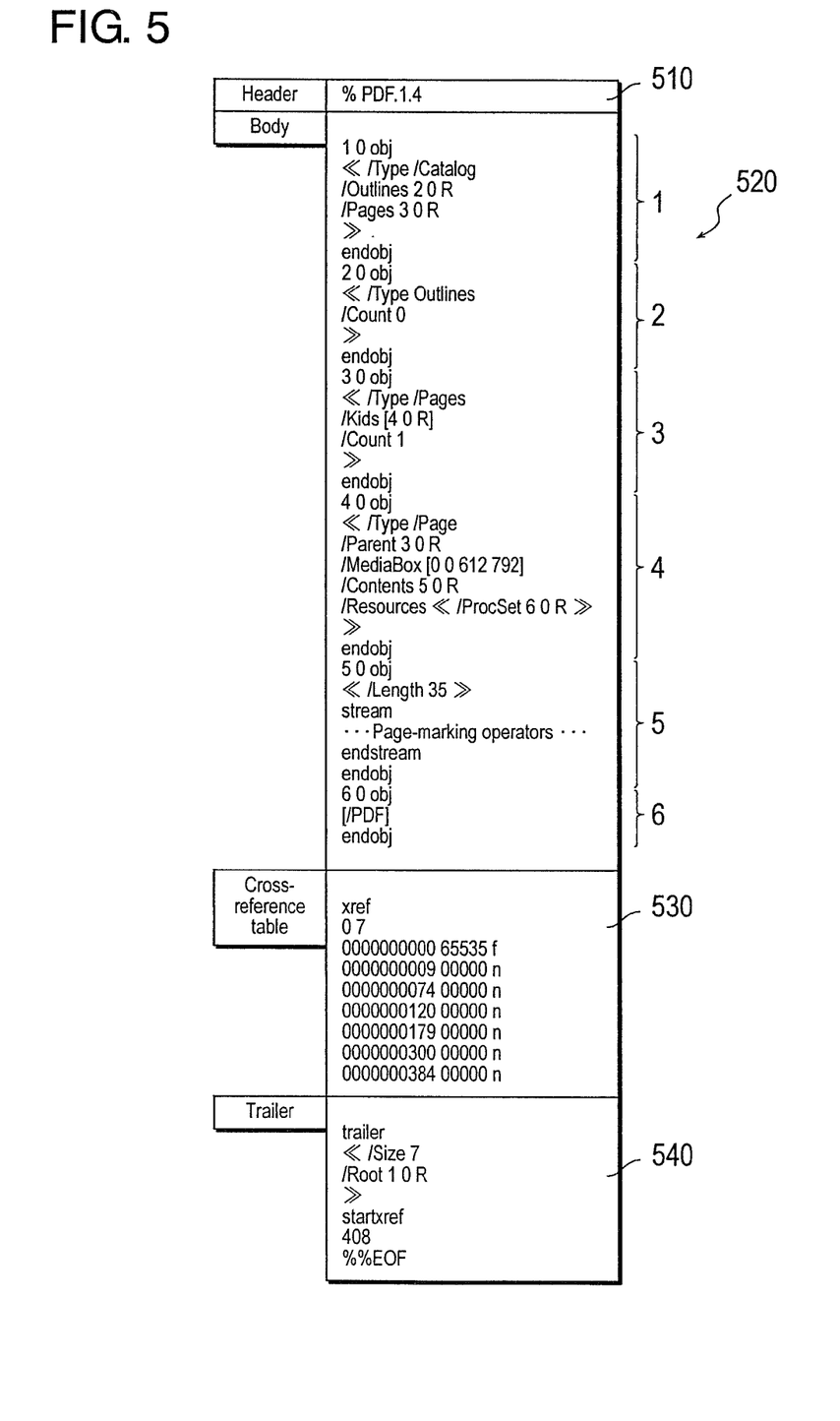
FIG. 5 shows a sample of the PDF file.
Figure 6:
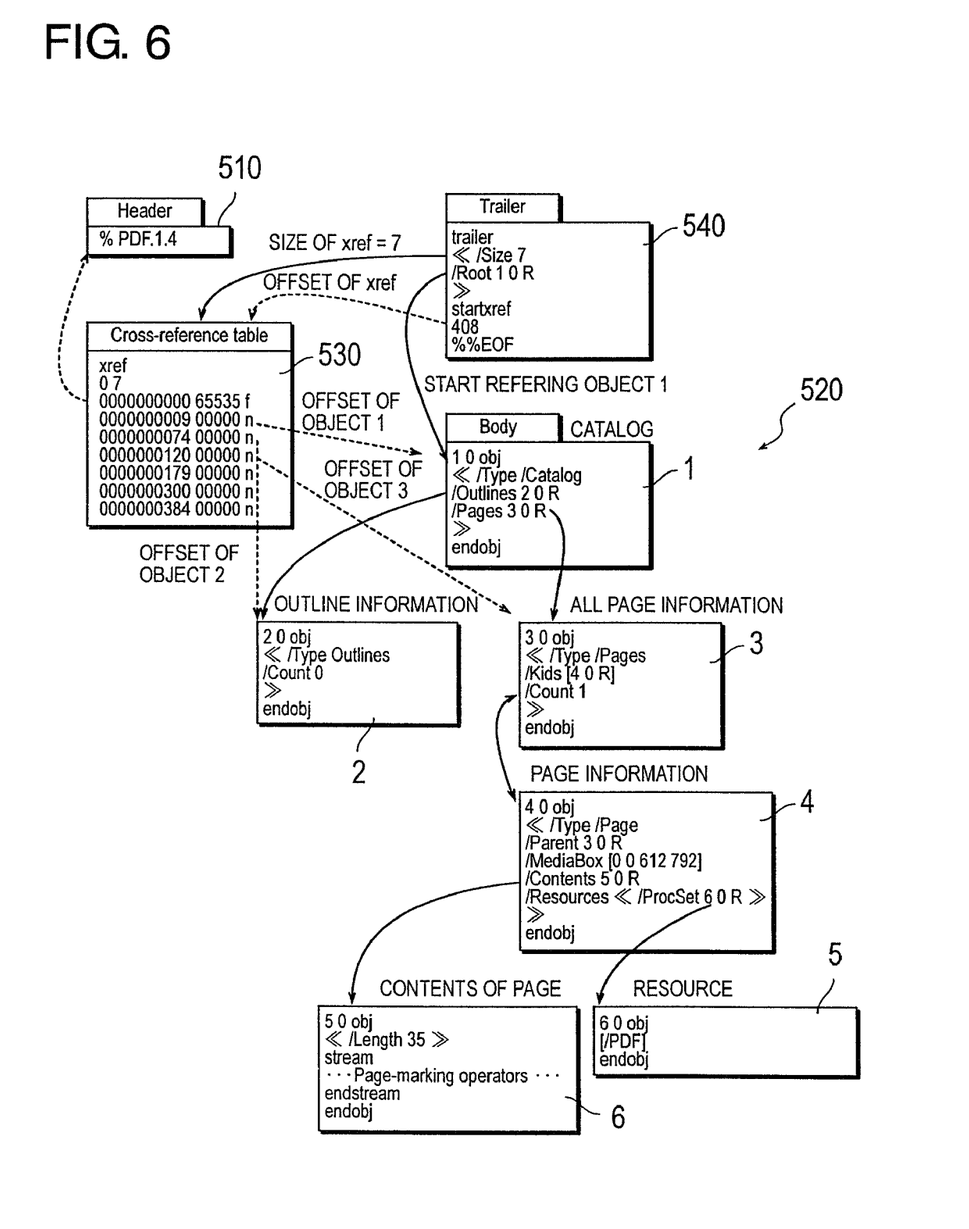
FIG. 6 is a diagram for describing the procedure of analyzing the PDF file.

The structure of a standard PDF file and the method of analyzing the PDF file will be described below with reference to FIG. 4 through FIG. 6. FIG. 4 is a diagram for describing the constitution of a standard PDF file, FIG. 5 is a diagram showing a sample of the PDF file, and FIG. 6 is a diagram for describing the procedure of analyzing the PDF file. FIG. 4 through FIG. 6 are prepared using "PDF Reference Third Edition Adobe Portable Document Format, Version 1.4" (Adobe Systems Incorporated) as a reference.

As can be seen from FIG. 4 and FIG. 5, a standard PDF file 500 consists of a header 510, a body 520, a cross-reference table 530, and a trailer 540.

The header 510 contains a comment that starts with %. From the header 510 shown in FIG. 5, one can see that the file's format is PDF, and the version (1.4 in this case) of the PDF specification.

The body 520 contains the objects that constitute the document (objects 1 through 6 in FIG. 5). The objects are the individual elements that constitute the document including the document structure, page information, font information, and color information. For example, the first object 1 is defined by the description from "10 obj" to "endobj" and other objects are also defined in a similar manner. Here, the first numeral and the second numeral in "10 obj" represent the ID number and the generation number of an object. In this body 520, various kinds of information such as file attributes, page attributes, character information, graphic information, and image information are constituted by combining minimum units called objects.

The cross-reference table 530 is reference information that indicates the position of the object within a file. In the cross-reference table 530, the locations of various objects with specific ID numbers (1 through 6 in FIG. 5) are shown by the byte counts (offset) from the front of the file to the front of the objects. This makes it possible to access the objects lined up in the body 520 at random. The cross-reference table 530 starts with a key word named "xref" in the actual file.

The trailer 540 is information to be accessed at the startup of the file analysis. More specifically, the position information of the cross-reference table 530 in the file and the ID number of an object (a root object to be the root of the hierarchical structure) that needs to be referenced first will be described in the trailer 540. The number that is indicated next to "startxref" is the number of bytes (offset) from the front of the file to the front of the cross-reference table 530. The row that includes "root" shows the ID number of the root object. Also, the row that includes "size" shows the number of objects existing in the file including the first entry (the ID number of the object is "0") of the cross-reference table 530. The trailer 540 exists in the end of the file and starts with a row that includes a key word named "trailer."

As shown in FIG. 6, the device for analyzing a standard PDF file analyzes the trailer 540 that exists at the end of the file first, and then analyzes the cross-reference table 530. Based on the information obtained in these analyses, it can analyze the contents of the page described in the body 520. The object contains the ID number of another object where the data that is required next is described. Consequently, by tracing the ID number of the object required next, the total analysis of the PDF file becomes possible. As the ID numbers of the objects that are to be referenced are indicated, the objects need not be arranged in the order of analyses in the body of the PDF file. Therefore, the objects can be described in the body of the PDF file in an arbitrary order and consequently be arranged in the file in an order different from the order of pages.

Figure 7:
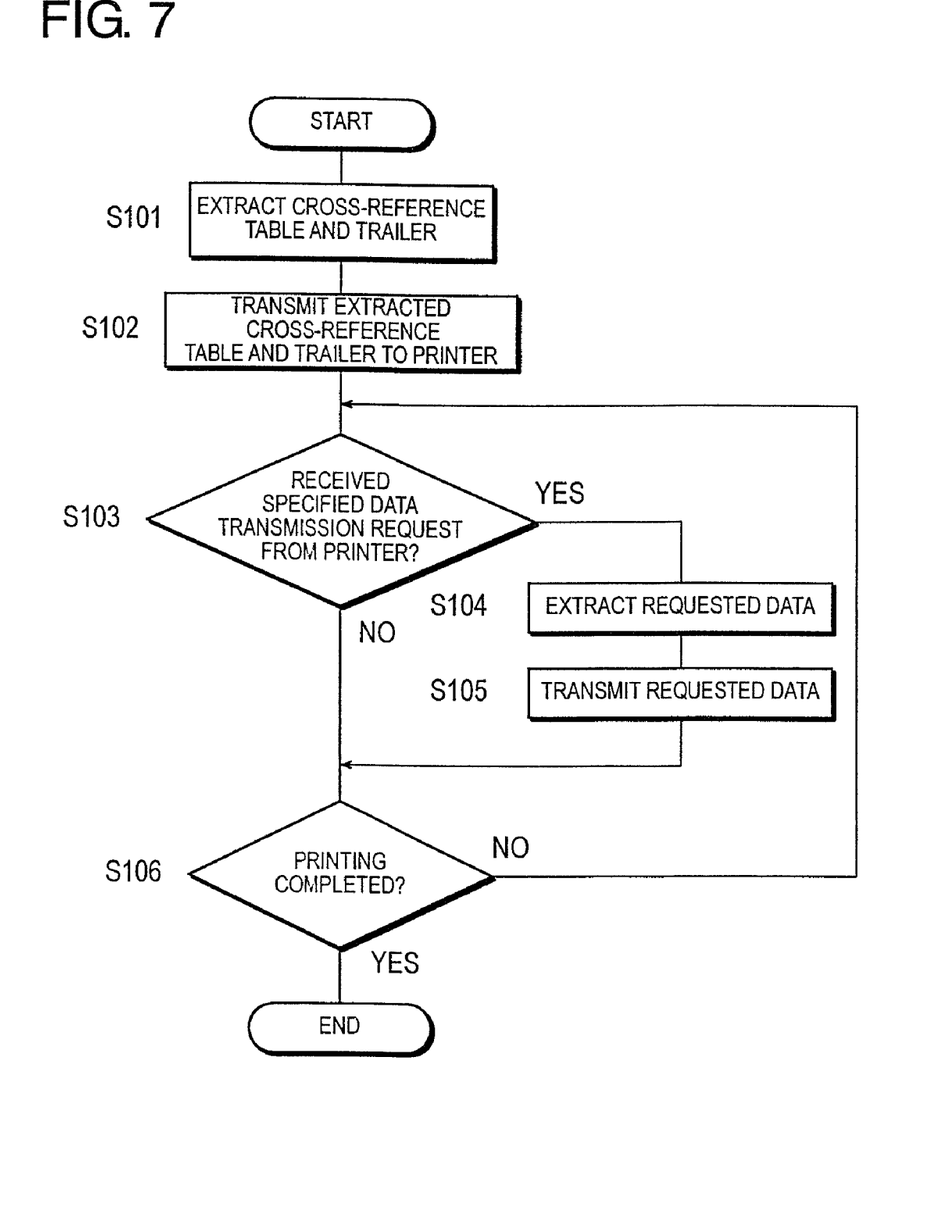
FIG. 7 is a flowchart for describing the process conducted in the PCs.

Next, the process performed in the PC 100A will be described with reference to FIG. 7. The algorithm shown in the flowchart of FIG. 7 is stored as a program in a storage unit such as a hard disk 104 of the PC 100A and executed by the CPU 101.

What is described below is that the normal printing where a printer driver is used for the PDF file 500 is not executed but the PDF direct printing is executed to print the PDF file by means of the printer 200.

An icon for the application program file of the PDF direct printing is displayed on the desktop of the PC 100A. The user can specify the execution of the PDF direct printing by activating the application program by dragging and dropping the PDF file 500 on the icon. The execution of the PDF direct printing can be specified by other means.

When the user specifies the execution of the PDF direct printing for the PDF file 500, the cross-reference table 530 and the trailer 540 will be extracted first from the PDF file 500 (S101).

The extraction of the cross-reference table 530 and the trailer 540 can be done by means of text retrieval of the keyword in the PDF file 500.

The extracted cross-reference table 530 and the trailer 540 will be transmitted to the image forming device, e.g., the printer 200, which was specified by the user in specifying the execution of the PDF direct printing (S102).

In the steps S101 and S102, the extraction and transmission of both the cross-reference table 530 and the trailer 540 are executed. However, it is possible to extract and transmit the cross-reference table 530 after extracting and transmitting the trailer 540 only. In this case, the extraction of the cross-reference table 530 can be done by using the offset value of the cross-reference table 530 shown next to "startxref" in correspondence with the request for transmission from the printer 200.

Next, a judgment is made as to whether a transmission request concerning the specified data among the PDF file 500 is received from the printer 200 (S103). The specific data here is the data (for example, a specific object), which becomes necessary in sequence in correspondence with the printing on the printer 200.

When the transmission request concerning a specific data is received (S103: Yes), the requested data is extracted from the PDF file 500 (S104), and is transmitted to the printer 200 (S105). On the other hand, if the transmission request concerning the specific data is not received (S103: No), the system advances to the step S106.

As a method of transmitting the PDF file from the PC 100A to the printer 200, it uses the method of establishing a session between the PC and the printer, and transferring the specified PDF file by means of executing the application program. Therefore, it will not burden the user with extra operations. However, it is also possible to realize the transfer of the PDF file using the function of the OS (Operating Software).

The data requested to be transmitted (e.g., an object) is specified by the number of bytes (offset) from the front of the file to the front of the data and the length of the data expressed in the number of bytes. As a transmission protocol, various protocols such as HTTP and FTP can be used.

In the step S106, a judgment is made as to whether the entire PDF file printing is completed by the printer 200. The completion of the printing can be judged by whether a printing completion notice is received from the printer 200.

If the printing of the PDF file is not completed (S106: No), the program returns to the step S103 and the process of the step S103 through S106 will be repeated. In other words, each time when a specific data is requested by the printer 200, the PC 100A extracts the data requested by the printer 200, and transmits the extracted data to the printer 200. When the printing of the entire PDF file is completed (S106: Yes), the execution of the process shown in FIG. 7 will be terminated.

Figure 8:
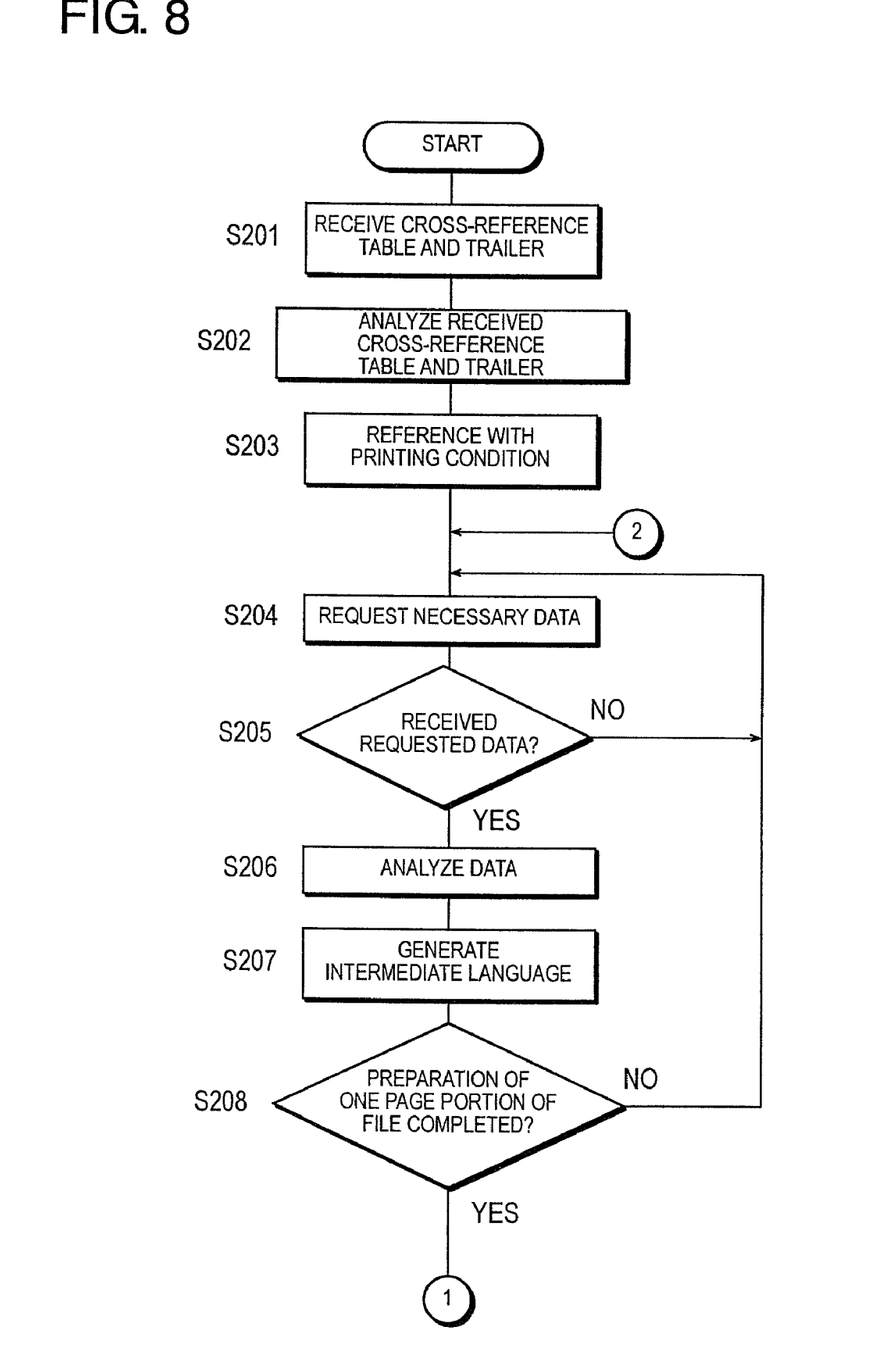
FIG. 8 is a flowchart for describing the process conducted in the printer.
Figure 9:
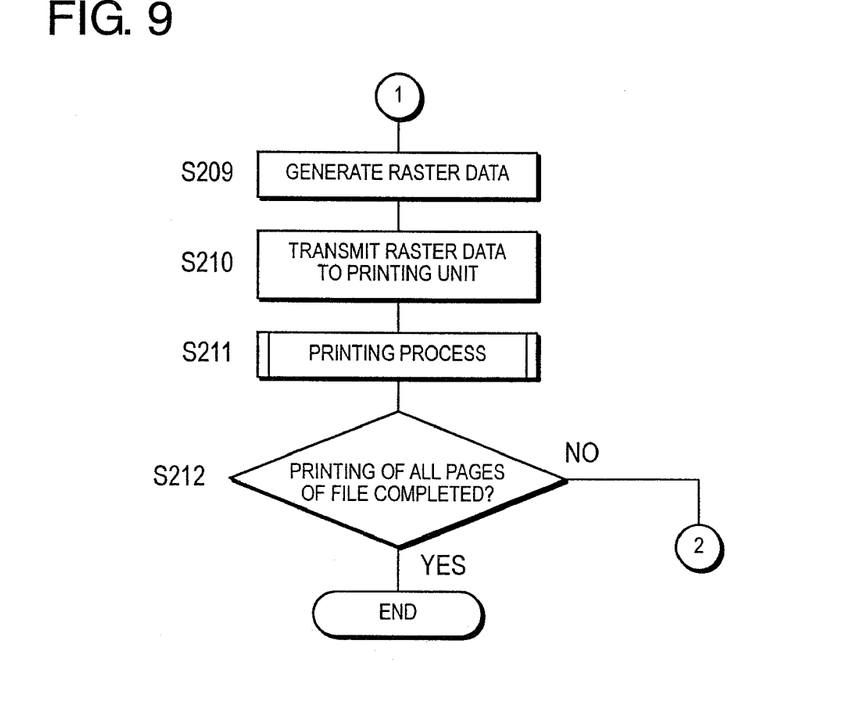
FIG. 9 is a flowchart for describing the process conducted in the printer continuing from FIG. 8.
Figure 10:
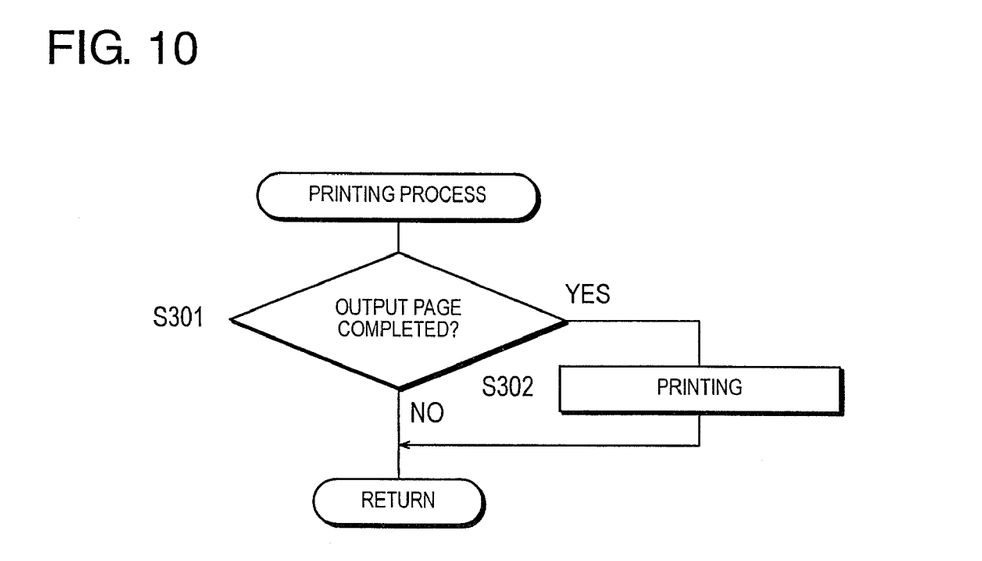
FIG. 10 is a flowchart for describing the printing process shown in FIG. 9.

Next, the process conducted in the printer 200 will be described below referring to FIG. 8 through FIG. 10. The algorithm shown in the flowcharts of FIG. 8 through FIG. 10 is stored as a program in a storage unit such as a ROM 202 of the printer 200 and executed by the CPU 201.

What is described below is a case where the printer 200 receives a PDF file from the PC 100A and executes the PDF direct printing of the received PDF file.

Figure 11:
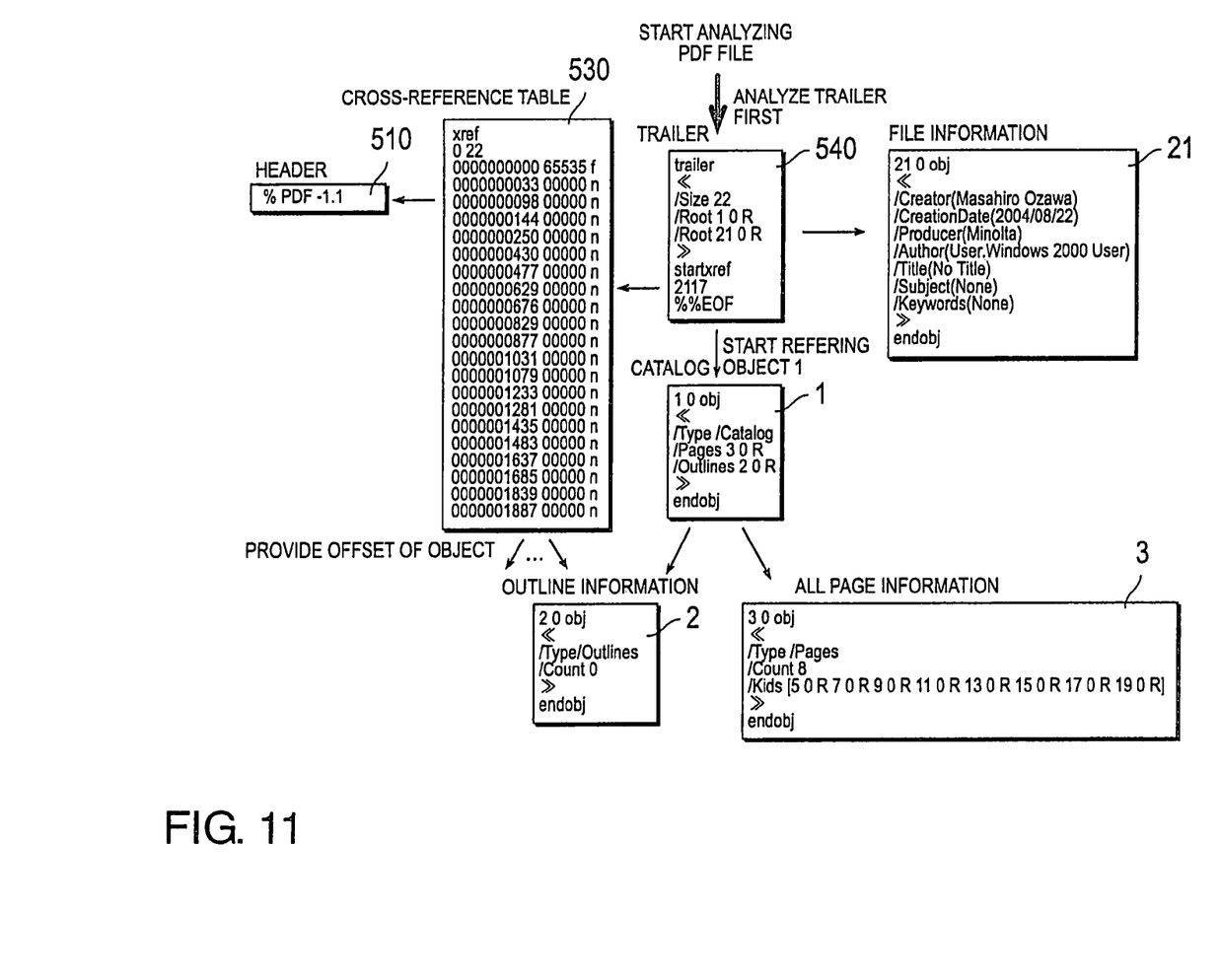
FIG. 11 is a diagram for describing the procedure of analyzing the PDF file consisting of multiple pages.
Figure 12:
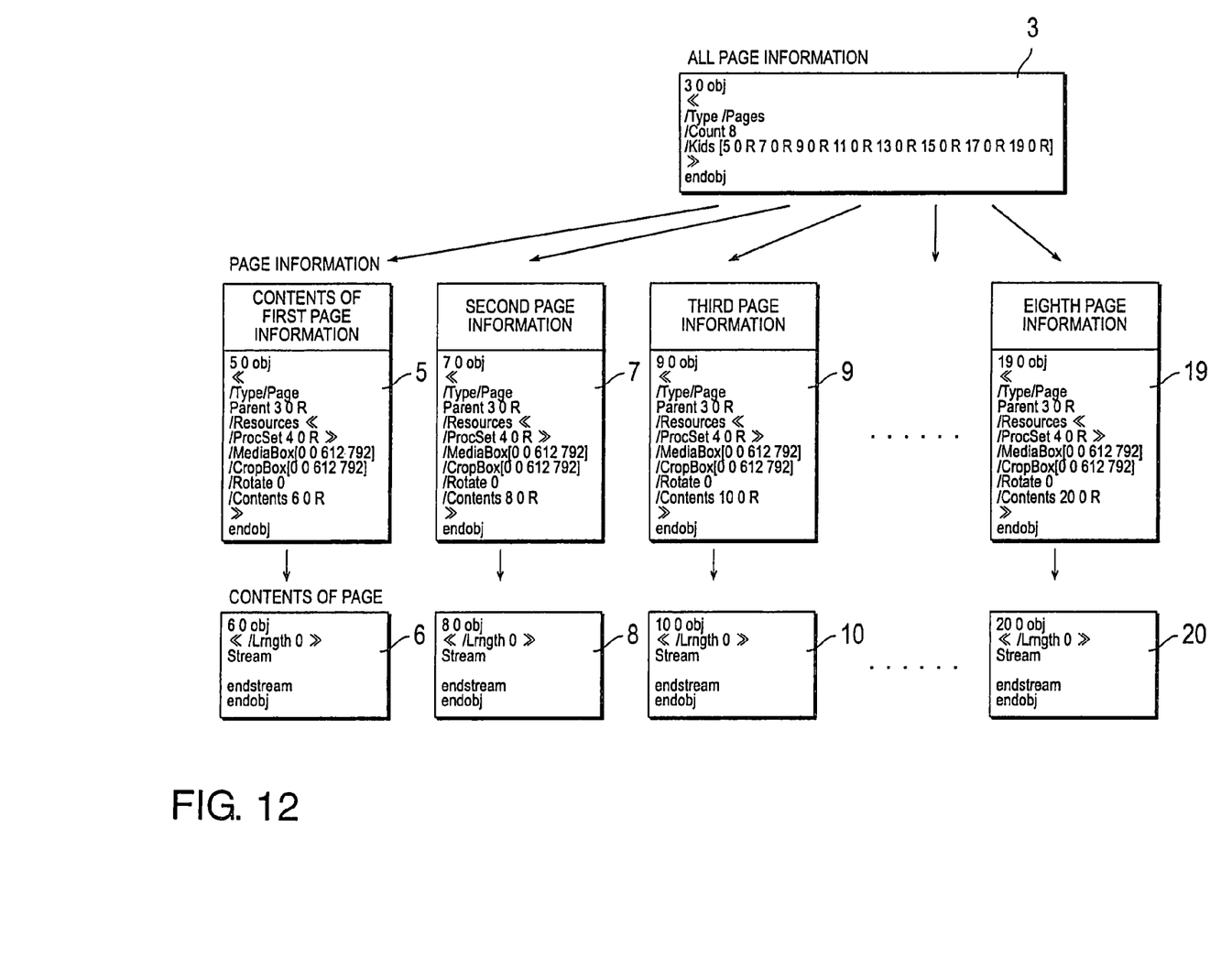
FIG. 12 is a diagram for describing the procedure of analyzing the PDF file consisting of multiple pages.

In order to describe the printing of a PDF file with multiple pages, a PDF file shown in FIG. 11 and FIG. 12 is used as a sample PDF file to be printed. FIG. 11 and FIG. 12 are diagrams for describing the procedure of analyzing the PDF file consisting of multiple pages. In FIG. 11 and FIG. 12, the constituting elements that are identical to those in the PDF file shown in FIG. 4 through FIG. 6 are identified with the identical numbers. The objects are identified by the ID numbers of the objects.

First, the printer 200 receives the cross-reference table 530 and the trailer 540 transmitted by PC 100A (S201).

Next, the received cross-reference table 530 and the trailer 540 are analyzed (S202). It is also possible first to receive and analyze only the trailer 540.

The analysis of the trailer 540 should clarify the number of the objects in the PDF file and the ID number ("1" in FIG. 11) of the object to be referenced first. The analysis of the cross-reference table 530 should clarify the offsets of the objects 1 through 21 as well. This makes it possible to access each object efficiently.

Next, the printing condition is checked (S203). The printing condition in this embodiment means the attribute related to the order of printing the pages. However, the printing condition may include other attributes related to printing.

Figure 13:
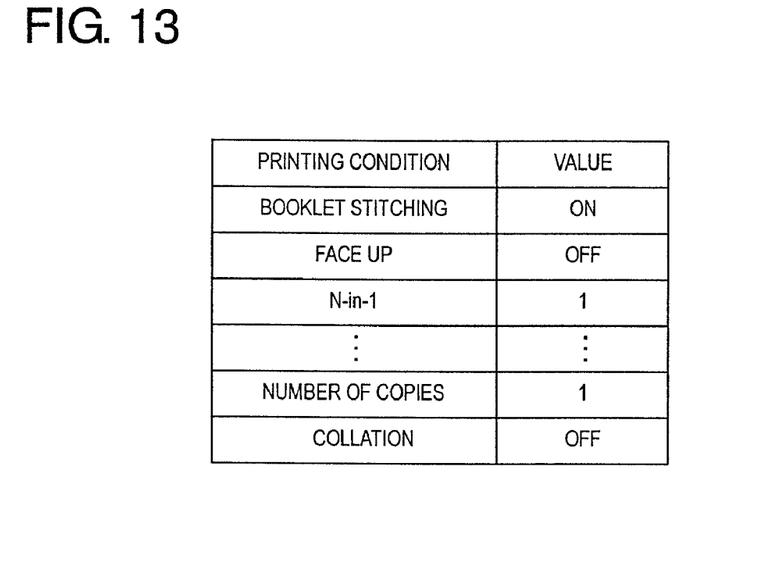
FIG. 13 is a diagram showing an example of printing condition.

FIG. 13 is a diagram showing an example of printing condition. When booklet stitching is applied, the value of the "booklet stitching" is set ON. When the face up process, i.e., the process of printing in sequence from the last page to the first page, is applied, the value of the "face up" is set ON; when the face down process, i.e., the process of printing in sequence from the first page to the last page, is applied, the value of the "face up" is set OFF. When the N-in-1 process, i.e., the process of printing multiple pages (N pages) on a sheet of paper in a reduced size, the "N-in-1" is set 2 if it is 2-in-1, or 4 if it is 4-in-1. If N-in-1 is not applied, the value of "N-in-1" is set to 1. If the collation process of printing the document per copy, the value of "collation" is set ON.

The printing condition is set through the operating panel unit 204 in the printer 200 and is stored in the printer 200 in advance. However, the printing condition can also be specified when the user instructs the execution of the PDF printing on the PC. In this case, the printing condition is transmitted from the PC to the printer, for example, together with the cross-reference table 530 and the trailer 540.

Next, the PDF file is analyzed based on the printing condition and the analysis results of the trailer 540 and the cross-reference table 530 to determine the necessary data for conducting an appropriate printing, and the transmission request for such necessary data is transmitted to the PC 100A (S204). The necessary data here can be an object or a combination of appropriate data such as multiple objects.

It then waits until the requested data is received from the PC 100A (S205: No). When the requested data is received (S205: Yes), the data will be analyzed (S206).

More specifically, the object 1, which should be referenced first, is requested to the PC 100A as the necessary data. It can be seen from the information of the object 1 to be referenced first, as shown in FIG. 11, that the entire page information that coordinates all pages is described in the object 3. Next, the object 3 is requested to the PC 100A as the necessary data. It can be seen from the information of the object 3 shown in FIG. 12 that the page information that contains the page attributes for pages 1 through 8 are described in the objects 5, 7, 9, 11, 13, 15, 17, and 19 respectively. The specific contents of each page are described in the objects 6, 8, 10, 12, 14, 16, 18, and 20 respectively.

In the step S207, no intermediate language that can be internally processed in the printer is generated after the analysis of the objects that are not the objects of page contents such as the objects 1 and 3. In the step in which the object 1 or 3 is analyzed, the preparation for one page of the PDF file (original file) is not completed as described later (S208: No), so that the program returns to the step S204.

Figure 14:
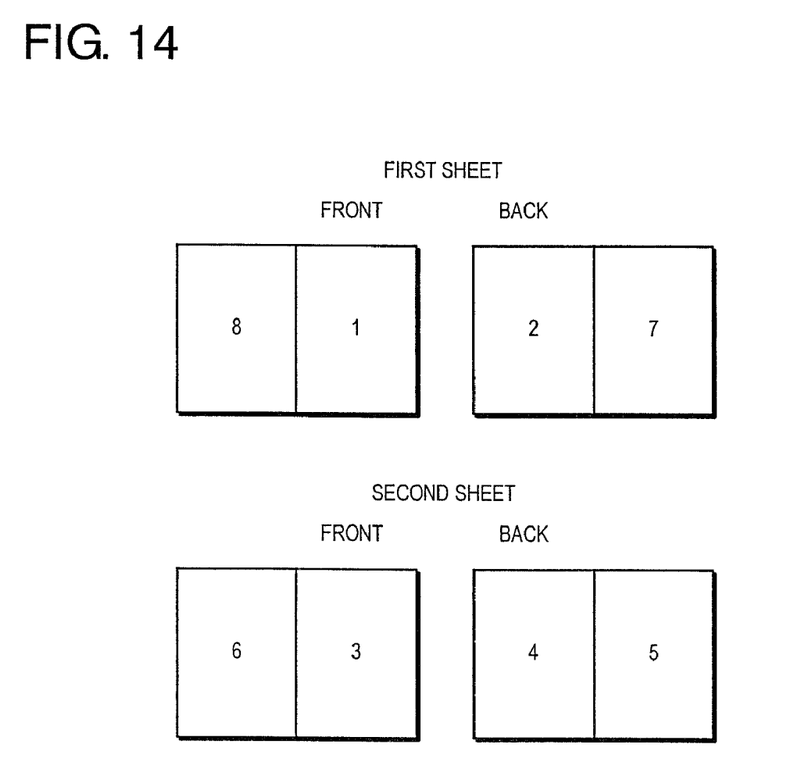
FIG. 14 is a diagram for describing the printing method where the booklet stitching is applied.

A case in which the booklet stitching is applied in the printing of the PDF file shown in FIG. 11 and FIG. 12 is described here as an example. When the booklet stitching is applied, the first sheet must be printed with the contents of the two pages from the first page backward as well as the two pages from the last page forward. More specifically, the first sheet must be printed with the contents of the pages 8 and 1 on the front and the contents of the pages 2 and 7 on the back respectively as shown in FIG. 14. The numerals in the rectangles in FIG. 14 show the page numbers.

Therefore, in the step S204, the object 19 concerning the page 8 is requested as the necessary data to the PC 100A. When the object 19 is received (S205: Yes), the object 19 is analyzed (S206). As a result of the object 19, it is known that the specific contents of the page 8 are described in the object 20. Therefore, the program goes back to the step S204 again and the object 20 is requested as the necessary data to the PC 100A. When the object 20 is received (S205: Yes), it is known that the data of the page 8 to be printed is obtained (S206). Thus, the intermediate language for the data on the page 8 is generated (S207).

In the step S208, it is judged whether the preparation for one page of the PDF file is completed. For example, if the data for one page consists of multiple objects and includes the object not yet processed, it is judged that the preparation for one page is not completed (S208: No), the program returns to the step S204 and the processes for the steps S204 through S207 are repeated. A judgment may be made in the step S208 as to whether the preparation for multiple pages of the PDF file is completed depending on the allowance of the usable capacity of the memory in the printer 200.

In the PDF file shown in FIG. 11 and FIG. 12, the data for one page consists of an object containing the contents of one page. Therefore, if the intermediate language for the data of the page 8 is generated in the step S207, it is judged that the preparation for one page of the PDF file is completed (S208: Yes). Raster data in the bit map format is generated from the generated intermediate language (S209). The raster data thus generated is transmitted to the printing unit 205 (S210), and the printing process is executed (S211).

When the printing process is executed as shown in FIG. 10, a judgment is made first as to whether the output page, which is the entire data to be printed on a single sheet of paper, is completed (S301). For example, in a general case where one page of the PDF file is to be printed on a sheet of paper, it is judged that the output page is completed when the raster data for one page is generated (S301: Yes), and the output page is printed on the paper (S302), and the program returns to the flowchart shown in FIGS. 8 and 9.

On the other hand, if the booklet stitching is to be applied to the PDF file shown in FIG. 11 and FIG. 12, the pages 8 and 1 as well as the pages 2 and 7 must be printed on the first sheet, so that it is judged that the output page is not completed yet if only the raster data for the page 8 has been generated (S301: No). In this case, the program returns to the flowchart of FIGS. 8 and 9 without printing.

In the step S212 shown in FIG. 9, a judgment is made as to whether the printing for the entire pages of the PDF file is completed. If the printing of the entire pages of the PDF file is not completed (S212: No), the program returns to the step S204 and the process of the steps S204 through S212 will be repeated.

Therefore, after the raster data is generated for the page 8 for the PDF file shown in FIG. 11 and FIG. 12, the raster data are generated for the pages 1, 2 and 7 following the same sequence as described above (S209), and are transmitted to the printing unit (S210), following which the printing process is executed (S211).

When the raster data are generated for all four pages, i.e., pages 8, 1, 2 and 7, of the PDF file, which are to be printed all on a single sheet of paper, it is judged that the output page is completed (S301: Yes), and the output page is printed on the paper (S302), and the program returns to the flow chart shown in FIGS. 8 and 9. If N-in-1 is applied as the printing condition, it is judged that the output page is completed each time when the raster data for N pages are generated.

Next, in executing the printing on the second sheet, the process for the pages 6, 3, 4, and 5 of the PDF file is executed using the same procedure as described above, and the completed output page is printed on the sheet (S302). However, it is also possible to print whenever the data to be printed on one side of a sheet are compiled.

When all the pages of the PDF file to be printed are completely printed (S212: Yes), the execution of the process shown in FIG. 8 through FIG. 10 is terminated.

If the booklet stitching process is to be applied to the printing of a PDF file as described above, necessary data will be requested by the printer to be transmitted from the PC in an order different from the order of pages in the file. Also, when the face up process is applied to the printing of a PDF file, the page data will be requested sequentially from the last page toward the first page of the file. If the face down process is applied, the page data will be requested sequentially in the same order as the order of pages in the file. In other words, even in printing the same PDF file, the order of printing pages is different depending on the printing condition. Thus, the data requested by the printer to be transmitted from the PC is determined with reference to the printing condition.

As a consequence, this embodiment enables the PC to extract a specified data from the document file and transmit it to the printer each time when the specified data is requested by the printer in case of transmitting to the printer a document file such as a PDF file without converting it into print data described in PDL such as PS.

Therefore, this embodiment makes it possible to print a document file such as a PDF file safely even when the document file is transmitted to a printer having a storage unit with a limited amount of usable capacity without converting it into print data. It is also capable of reducing the load of the transmission side, i.e., the PC, as it is not necessary to do any changes such as reconstitution and conversion of a document file on the document transmission side.

It can also easily handle any special printing conditions such as booklet stitching or face up, which require printing a file in an order different from the order of pages in the file, by determining the data, which is requested by the printer to be transmitted from the PC, with reference to the printing condition.

It is obvious that this invention is not limited to the particular embodiments shown and described above but may be variously changed and modified without departing from the technical concept of this invention.

For example, it is possible to use a computer such as a workstation or a server instead of a PC as the device that works as an image processing device. It is also possible to use, in place of a printer, an image forming device such as a facsimile machine, a copying machine, or an MFP (multi-function peripheral) that has a combination of their functions.

It is also possible to realize the means and method of various processes for transmitting document files such as PDF files without converting into print data from the image processing device to the image forming device to be printed by a dedicated hardware circuit or a programmed computer. The program can be provided either by a computer readable recording medium such as a flexible disk and a CD-ROM, or by being supplied on-line via a network such as the Internet. In this case, the program recorded on the computer readable recording medium is normally transferred to and stored in a storage device such as a hard disk. The program can also be provided as independent application software or can be built into the software of the device as a part of its function.

What is claimed is:

1. An image forming device for receiving and printing a document file, which includes objects that can be arranged in the file in an order different from the order of pages as well as reference information that indicates the locations of said objects within the file, and which defines pages having a specified object, from an image processing device without converting said document file into print data, comprising:
   a first receiver for receiving, from said image processing device, information, which is automatically extracted from said document file to be printed and is to be accessed when starting an analysis of said document file, wherein said first receiver is configured to receive said extracted information prior to requesting any data from the image processing device;
   a controller for determining a necessary data from said document file based on the result of the analysis of the information received by said first receiver;
   a transmitter for transmitting a transmission request concerning said necessary data to said image processing device;
   a second receiver for receiving the data transmitted by said image processing device in correspondence with said transmission request; and
   a printing unit for printing based on the data received by said second receiver.

2. An image forming device as claimed in claim 1, wherein said controller determines said necessary data with reference to printing conditions related to an order of printing pages.

3. An image forming device as claimed in claim 1, wherein said document file is a Portable Document Format (PDF) file.

4. An image forming device as claimed in claim 3, wherein the information to be accessed when starting an analysis of said document file includes a trailer.

5. An image forming device as claimed in claim 1, wherein the information and data received by said first and second receivers are not linearized.

6. A non-transitory computer readable medium on which a program is recorded, the program to be used in an image forming device for receiving and printing a document file, which includes objects that can be arranged in the file in an order different from the order of pages as well as reference information that indicates the locations of said objects within the file, and which defines pages having a specified object, from an image processing device without converting said document file into print data, said program causing the image forming device to execute a process comprising the steps of:
   1) receiving, from said image processing device, information, which is automatically extracted from said document file to be printed and is to be accessed when starting an analysis of said document file, said image forming device receiving said extracted information prior to requesting any data from said image processing device;
   2) determining a necessary data from said document file based on the result of the analysis of the information received in step 1);
   3) transmitting a transmission request concerning said necessary data to said image processing device;
   4) receiving the data transmitted by said image processing device in correspondence with said transmission request; and
   5) printing based on the data received in step 4).

7. A non-transitory computer readable medium as claimed in claim 6, wherein said necessary data is determined with reference to printing conditions related to an order of printing pages in step 2).

8. A non-transitory computer readable medium as claimed in claim 6, wherein said document file is a Portable Document Format (PDF) file.

9. A non-transitory computer readable medium as claimed in claim 8, wherein the information to be accessed when starting an analysis of said document file includes a trailer.

10. A non-transitory computer readable medium as claimed in claim 6, wherein the information and data received in said steps 1) and 4) are not linearized.

11. An image forming method of an image forming device for receiving and printing a document file, which includes objects that can be arranged in the file in an order different from the order of pages as well as reference information that indicates the locations of said objects within the file, and which defines pages having a specified object, from an image processing device without converting said document file into print data, comprising the steps of:
   1) receiving, from said image processing device, information which is automatically extracted from said document file to be printed and is to be accessed when starting an analysis of said document file, said image forming device receiving said extracted information prior to requesting any data from said image processing device;
   2) determining a necessary data from said document file based on the result of the analysis of the information received in step 1);
   3) transmitting a transmission request concerning said necessary data to said image processing device;

4) receiving the data transmitted by said image processing device in correspondence with said transmission request; and 5) printing based on the data received in step 4).

12. An image forming method as claimed in claim 11, wherein said necessary data is determined with reference to printing conditions related to an order of printing pages in step 2).

13. An image forming method as claimed in claim 11, wherein said document file is a Portable Document Format (PDF) file.

14. An image forming method as claimed in claim 13, wherein the information to be accessed when starting an analysis of said document includes a trailer.

15. An image forming method as claimed in claim 11, wherein the information and data received in said steps 1) and 4) are not linearized.

* * * * *